United States Patent [19]

Stuart

[11] Patent Number: 4,685,420
[45] Date of Patent: Aug. 11, 1987

[54] ANIMAL LITTER AND RELATED PROCESSES

[75] Inventor: Glenn A. Stuart, Midland, Mich.

[73] Assignee: The Dow Chemical Company, Midland, Mich.

[21] Appl. No.: 807,625

[22] Filed: Dec. 11, 1985

[51] Int. Cl.$^4$ .............................................. A01K 1/015
[52] U.S. Cl. ...................................................... 119/1
[58] Field of Search ........................................... 119/1

[56] References Cited

U.S. PATENT DOCUMENTS

| | | | |
|---|---|---|---|
| 3,765,371 | 10/1973 | Fisher | 119/1 |
| 4,009,684 | 3/1977 | Kliment et al. | 119/1 |
| 4,275,684 | 6/1981 | Kramer et al. | 119/1 |
| 4,315,761 | 2/1982 | Larrson et al. | 119/1 |
| 4,395,357 | 7/1983 | Kramer et al. | 119/1 |
| 4,409,925 | 10/1983 | Brundrett et al. | 119/1 |
| 4,494,481 | 1/1985 | Rodriguez et al. | 119/1 |
| 4,494,482 | 1/1985 | Arnold | 119/1 |
| 4,506,628 | 3/1985 | Stockel | 119/1 |
| 4,638,763 | 1/1987 | Greenberg | 119/1 |

Primary Examiner—Robert P. Swiatek

[57] ABSTRACT

This invention relates to an animal litter comprising a porous, inert solid substrate and a dry particulate polymer. When animal urine contacts the animal litter there are produced gelled agglomerates containing the animal urine, polymer and solid substrate. The gelled agglomerates have sufficient mechanical integrity to be conveyed as discrete entities thereby permitting animal urine to be physically removed from a litter box containing the animal litter of the present invention.

16 Claims, 1 Drawing Figure

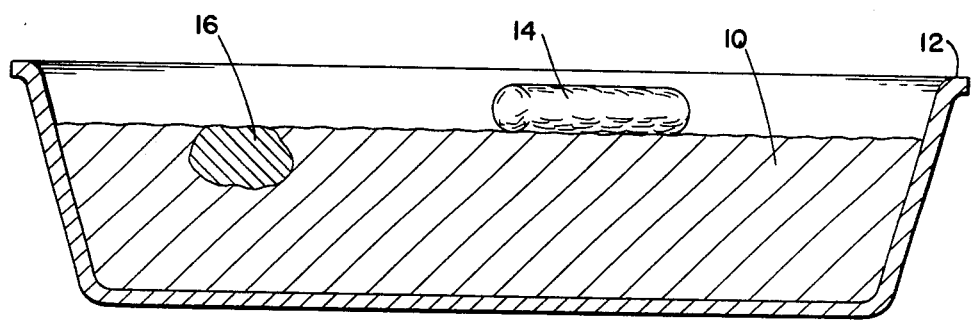

ANIMAL LITTER AND RELATED PROCESSES

Animal litter and the deodorizing of animal slag products such as feces and urine are well known. In particular it is common for cat owners to provide, in the owner's domicile, a litter box containing cat litter. This cat litter generally comprises a porous inert solid substrate. As is well known, it is the habit of house-broken cats to deposit their slag material in the cat litter and not in other portions of the domicile. However, the animal litter still gives off objectionable odors because of the presence of the animal slag product.

In order to reduce these odors, it is common practice for some homeowners to periodically physically remove the feces from the litter. This results in some reduction in the odors due to the feces, but has no effect on the odors caused by the urine. When the odors from the urine become intolerable, it is common practice for the homeowner to discard the litter entirely. The homeowner then washes the litter box and refills the litter box with fresh litter. These activities are unpleasant, time-consuming and expensive.

It is therefore an object of the present invention to provide improved animal litter substantially free of the disadvantages of prior animal litter.

Another object of the present invention is to provide an improved method for keeping a household free of urine odors.

Another object is to provide an improved animal litter rendering possible the physical removal of urine from the litter box.

A still further object of the present invention is to extend the life of animal litter thereby reducing its cost.

Still another object is to provide animal litter in a fresh condition free from odors caused by animal slag products even though the animal slag products are deposited on and in the animal litter.

Additional objects and advantages of the present invention will be apparent by reference to the following description and the drawings.

The single figure of the drawings shows a litter box containing animal litter of the present invention.

According to the present invention, there is provided an improved animal litter comprising a porous inert solid substrate and a water absorbent polymer. Water absorbent polymers useful in the animal litter of the present invention are capable of absorbing many times their own weight of an aqueous fluid such as urine. In addition, the water absorbent polymers in this animal litter exhibit a high degree of gel strength after absorption of an aqueous fluid which permits removal of urine from a litter box in the form of a coherent gelled product. When an animal urinates on the animal litter of this invention, the urine is absorbed by the water absorbent polymer as well as by the porous substrate, thus forming a gelled product of water absorbent polymer, urine and substrate. This gelled product has sufficient mechanical integrity to be removed from a litter box using implements and methods typically used to remove feces from a litter box.

In accordance with the present invention there is provided an animal litter which permits mechanical removal of urine from a litter box. The animal litter of this invention agglomerates the urine deposited thereupon, permitting mechanical removal of gelled agglomerates containing the urine. It is known that owners of animals who use litter boxes must manually remove or scoop out feces from the litter box on a daily basis. The animal litter of the present invention permits the animal owner to employ the same removal techniques to remove urine from the litter box. Heretofore it was not possible to mechanically remove urine from a litter box because urine tended to spread throughout the litter in the litter box as it was absorbed.

When an animal urinates on the animal litter of the present invention, the urine is absorbed by the water absorbent polymer and porous substrate, thereby forming a neat, gelled agglomerate of urine, polymer and substrate particles. This gelled agglomerate has sufficient machanical integrity that it can be removed from the litter box by the same removal technique employed for solid feces. The litter remaining in the litter box after removal of the gelled agglomerates and solid feces is clean and useful, as though it were completely fresh.

It is well known that animal litter upon which an animal has urinated emits an objectionable odor. Due to this odor, the animal litter in a litter box must be replaced frequently, often before the animal litter has been completely used. The animal litter of the present invention does not emit this typical urine odor. The volatile odor components of the animal urine are apparently trapped in the gelled agglomerate and are removed from the litter box therewith. The volatile odor components are trapped in the gelled agglomerate and are thus kept out of the atmosphere.

The animal litter of the present invention exhibits several advantages over known animal litters. The animal litter of this invention allows removal of urine from a litter box as a discrete entity in the form of a gelled agglomerate of urine, water absorbent polymer and porous substrate particles. The litter remaining in the litter box is fresh and useful, and thus the animal litter of this invention can be replaced less frequently than known litter materials. The cost of the animal litter is reduced since the animal litter which has not been used need not be discarded. Further, the animal litter of the present invention does not emit an objectionable urine odor because the volatile odor components of the urine are trapped in the gelled agglomerates and removed from the litter box therewith.

The animal litter of the present invention comprises a porous, inert solid substrate and a water absorbent polymer. Known water swellable and water absorbent polymers are described in the following patents: U.S. Pat. Nos. Re. 31,822, 3,669,103, 3,686,024, 3,758,641, 3,810,468, 3,900,030, 3,926,891, 3,954,721, 3,959,569, 3,966,679, 3,980,663, 3,983,095, 3,989,586, 3,993,616, 4,008,353, 4,017,653, 4,018,951, 4,026,932, 4,041,020, 4,041,228, 4,041,231, 4,056,502, 4,057,521, 4,061,846, 4,071,650, 4,076,673, 4,076,928, 4,079,029, 4,132,695, 4,154,898, 4,186,233, 4,293,609, 4,424,247, 4,435,172, 4,444,830, 4,459,068, 4,486,374, 4,500,585, 4,500,670, 4,511,477, 4,526,240, 4,529,739, and 4,535,098.

According to the present invention, there is provided an imprdved animal litter comprising a porous substrate and a water absorbent polymer. A preferred water absorbent polymer is that of Formula I:

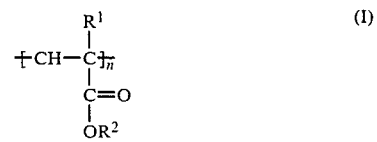

wherein $R^1$ is hydrogen or methyl, but is preferably hydrogen; wherein $R^2$ is an alkali metal; and wherein n is an integer from 10 to 50,000 inclusive but is preferably an integer from 100 to 10,000 inclusive.

Examples of suitable alkali metals include lithium, potassium and most preferably sodium.

A particular advantageous polymer of Formula I is the polymer of Formula II:

(II)

The polymers of Formula I and II are known in the art and can be produced according to known techniques. These polymers can be produced by polymerizing at least one monomer selected from the group consisting of acrylic acid, methacrylic acid and alkali metal salts of acrylic acid and methacrylic acid. The polymer when made using unneutralized acidic monomers is conveniently neutralized using inorganic bases such as alkali metal hydroxides.

The polymer of Formula I can be prepared using known polymerization techniques. This polymerization is preferably accompished in the presence of a polymerization initiator. Suitable polymerization initiators include inorganic persulfates such as sodium persulfate. To produce the polymer of Formula I, monomers of acrylic acid, methacrylic acid or the alkali metal salts of acrylic or methacrylic acid are crosslinked by any suitable means. Preferably the crosslinking agent is a polyvinyl monomer such as trimethylolpropane di- or triacrylate. The polymer of Formula I may optionally have a water-insoluble inorganic material such as fumed silica incorporated therewith.

In one embodiment of the present invention the polymer of Formula I is produced in the presence of a higher alkyl ester of $\alpha,\beta$-ethylenically unsaturated carboxylic acids such as dodecyl acrylate, dodecyl methacrylate, lauryl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 4 to about 22, preferably from 8 to about 20, carbon atoms with ethylenically unsaturated carboxylic acids such as acrylic acid, methacrylic acid, fumaric acid, itaconic acid and aconitic acid, and maleic anhydride. Of these, lauryl methacrylate and other alkylmethacrylates and alkylacrylates wherein alkyl has from 10 to 20 carbon atoms are preferred. It is believed that the alkyl ester forms no part of the polymer of Formula I.

The water absorbent polymer of Formula I can be employed in combination with the substrate in any amount sufficient to bind the urine, but generally comprises from 0.01 to 5.0 and preferably comprises from 0.1 to 2.0 percent by weight based on the weight of the substrate.

Examples of suitable porous inert solid substrates include among others wood chips, wood shavings, wood flour, sawdust, straw, clay, porous beads such as those of polyethylene, polypropylene or polystryene, shredded paper, cloth, alfalfa, cotton, sand, bark, ground corn husks, ground sugar cane, lignocellulose, cellulose, calcium silicate, and calcium sulfate.

The solid substrate is usually particulate and generally has a particle size of 0.01 to 10.0 and preferably from 0.1 to 5 millimeters.

The animal litter of the present invention is preferably produced by dry blending the water absorbent polymer and the porous solid substrate.

Animals with which the animal litter of the present invention can advantageously be employed include among others household pets such as cats, dogs, gerbils, guinea pigs, mice and hamsters; other pets such as rabbits, ferrets and skunks; as well as laboratory animals such as monkeys, mice, rats, horses, cows and sheep. The animal litter of the present invention is especially useful for cats.

The animal litter of the present invention can comprise additional ingredients such as perfumes, deodorants, odor absorbents, antimicrobial agents, disinfectants, colorants and pesticides.

Referring now to the single figure of the drawings, there is shown animal litter 10 of the present invention. The animal litter 10 is contained in a litter box 12. Feces represented by the cylinder 14 is deposited on the litter 10. Urine which has been deposited in litter 10 forms a gelled agglomerate or shaped solid 16.

It is common practice for a homeowner, daily or more often to remove cylinders 14 from the litter box 12. A homeowner can easily concurrently remove the shaped solids 16 and in this manner physically remove the urine from the litter 10.

The invention may be better understood by reference to the following examples wherein all parts and percentages are by weight unless otherwise indicated.

These examples are designed to teach those skilled in the art how to practice the invention and represent the best mode presently contemplated by the inventor for practicing the invention.

EXAMPLE 1

This example illustrates the synthesis of a known polymer of Formula I.

The following quantities of the following ingredients are combined as indicated.

| Item | Ingredient | Quantity (lbs) |
| --- | --- | --- |
| A | acrylic acid | 0.001 |
| B | lauryl methacrylate | 0.42 |
| $B^1$ | VAZO 52 (Azo catalyst) | 0.0004 |
| C | acrylic acid | 42.5 |
| D | water | 64.0 |
| E | 50% wt. NaOH/50% wt. water | 40.0 |
| F | sodium persulfate | 0.022 |
| G | hydrocarbon oil | 150.0 |
| H | fumed methylated silica | 0.4 |
| I | trimethylolpropane triacrylate | 0.25 |

Items A, B and $B^1$ are mixed along with an equal amount by weight of hydrocarbon oil and heated to 40° C. and maintained at that temperature for eighteen (18) hours. The resultant product is called an acrylic acid prepolymer.

Items C, D, E and F are mixed in a first vessel.

Items G, H and I are mixed in a second vessel. The acrylic acid prepolymer is then added to the second vessel. Thereafter, the contents of the first vessel are added to the second vessel with agitation. The contents of the second vessel are maintained at 55° C. for one (1)

hour. The temperature is then raised to 100° C. and maintained at that level for one (1) hour.

The contents of the second vessel are then heated for a time sufficient to remove essentially all the water. The resultant product is in the form of dry granular beads suspended in hydrocarbon oil. The dried beads are then separated from the oil phase. Subsequently the oil is evaporated from the bead surface to give a dry product. These beads constitute a polymer of Formula I.

EXAMPLE 2

This example illustrates the synthesis of animal litter of the present invention.

The following quantities of the following ingredients were combined as indicated.

| Item | Ingredient | Quantity (grams) |
|---|---|---|
| A | Substrate | 9626 |
| B | Beads of Example 1 | 56.4 |

The substrate is Daily Brand cat litter distributed by the Altantic and Pacific Tea Company.

Items A and B were thoroughly mixed by hand in a plastic container to produce an animal litter of the present invention. The plastic container also serves as a litter box. The litter box was placed on the floor in a domicile containing three cats. The three cats which reside in the domicile were allowed to deposit their slag products on the litter at will. The cat urine formed agglomerated balls comprising the urine, the substrate material and the polymer. The gelled balls were physically removed once or twice per day.

Even though the litter box was in constant use by three cats, it remained substantially free of odor for 90 days.

Although the invention has been described in considerable detail with reference to certain preferred embodiments, it will be understood that modifications can be made without departing from the spirit of the invention as described above and as claimed below.

What is claimed is:

1. An animal litter capable of agglomerating animal urine to facilitate removal of the animal urine from a litter box containing the animal litter, said animal litter comprising:
   A. a particulate, porous, inert solid substrate; and
   B. a dry, particulate water absorbent polymer in an amount sufficient to agglomerate animal urine deposited in the litter box and thereby form a gelled agglomerate having sufficient mechanical integrity to be conveyed from the litter box as a discrete entity.

2. The animal litter of claim 1 wherein the water absorbent polymer comprises from 0.01 to 5.0 percent by weight based upon the weight of the substrate.

3. The animal litter of claim 1 wherein the water absorbent polymer comprises from 0.1 to 3.0 percent by weight based upon the weight of the substrate.

4. The animal litter of claim 1 wherein the water absorbent polymer is a reaction product obtained by combining acrylic acid, laurylmethacrylate, water, sodium hydroxide, sodium persulfate, hydrocarbon oil, silica and trimethylolpropane triacrylate.

5. An animal litter capable of agglomerating animal urine to facilitate removal of the animal urine from a litter box containing the animal litter, said animal litter comprising:

A. a particulate, porous, inert solid substrate; and
B. a dry, particulate water absorbent polymer in an amount sufficient to agglomerate animal urine in the litter box and thereby form a gelled agglomerate having sufficient mechanical integrity to be conveyed from the litter box as a discrete entity, said water absorbent polymer being a polymer of Formula I:

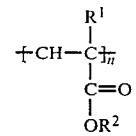

wherein $R^1$ is hydrogen or methyl, $R^2$ is an alkali metal, and n is an integer from 10 to 50,000 inclusive.

6. The animal litter of claim 5 wherein $R^1$ is hydrogen.

7. The animal litter of claim 5 wherein $R^2$ is sodium.

8. The animal litter of claim 5 wherein n is an integer from 100 to 10,000 inclusive.

9. The animal litter of claim 5 wherein the water absorbent polymer comprises from 0.01 to 5.0 percent by weight based upon the weight of the substrate.

10. The animal litter of claim 5 wherein the water absorbent polymer comprises from 0.1 to 3.0 percent by weight based upon the weight of the substrate.

11. An animal litter capable of agglomerating animal urine to facilitate removal of the animal urine from a litter box containing the animal litter, said animal litter comprising:
   A. a particulate, porous inert solid substrate; and
   B. a dry, particulate water absorbent polymer in an amount sufficient to agglomerate animal urine in the litter box and thereby form a gelled agglomerate having sufficient mechanical integrity to be conveyed from the litter box as a discrete entity, and water absorbent polymer being a polymer of Formula II:

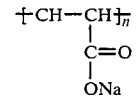

wherein n is an integer from 100 to 10,000 inclusive;
wherein, the water absorbent polymer comprises from 0.1 to 2 percent by weight based upon the weight of the substrate; and
wherein the animal litter comprises discrete particles of the substrate in admixture with discrete particles of the water absorbent polymer.

12. An animal litter capable of agglomerating animal urine to facilitate removal of the animal urine from a litter box containing the animal litter, said animal litter comprising:
   A. a particulate, porous inert solid substrate; and
   B. a dry, particulate water absorbent polymer in an amount sufficient to agglomerate animal urine in the litter box and thereby form a gelled agglomerate having sufficient mechanical integrity to be conveyed from the litter box as a discrete entity, said water absorbent polymer comprising a polymer produced by polymerizing at least one member selected from the group consisting of acrylic acid, methacrylic acid and alkali metal salts of acrylic acid and methacrylic acid, in the presence of a member selected from the group consisting of alkylmethacrylates and alkylacrylates wherein alkyl has from 10 to 20 carbon atoms.

13. A process for agglomerating animal urine to facilitate removal of the urine from a litter box, said process comprising contacting the animal urine with an animal litter in the litter box, said animal litter comprising a porous inert solid substrate in admixture with a dry, particulate water absorbent polymer.

14. A process for removing animal urine from a litter box, said process comprising:
   I. providing a litter box containing an animal litter, said animal litter comprising a dry, particulate water absorbent polymer in admixture with a porous, particulate solid substrate; and
   II. depositing animal urine on the animal litter in the litter box thereby producing a gelled agglomerate of the water absorbent polymer, the animal urine and the substrate, said gelled agglomerate having sufficient mechanical integrity to be conveyed as a discrete entity; and
   III. removing the gelled agglomerate from the litter box thereby removing the animal urine from the litter box.

15. A process for agglomerating animal urine to facilitate removal of the urine from a litter box, said process comprising contacting the animal urine with an animal litter in the litter box, said animal litter comprising a porous, inert solid substrate in admixture with a water absorbent polymer of Formula I:

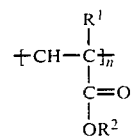

wherein $R^1$ is hydrogen or methyl, $R^2$ is an alkali metal, and n is an integer from 10 to 50,000 inclusive.

16. A process for maintaining the cleanliness of a cat-containing domicile comprising in sequence the steps of:
   I. providing a litter box containing an animal litter capable of agglomerating cat urine to facilitate removal of the cat urine from the litter box, said animal litter comprising:
      A. a particulate, porous, inert solid substrate in admixture with
      B. a dry, particulate, water absorbent polymer in an amount sufficient to agglomerate the cat urine; and
   II. depositing cat urine in contact with the animal litter to produce a gelled agglomerate comprising cat urine, water absorbent polymer and solid substrate, said gelled agglomerate having sufficient mechanical integrity to be conveyed from the litter box as a discrete entity; and
   III. periodically removing gelled agglomerates from the litter box and from the domicile.

* * * * *